(12) United States Patent
Delano

(10) Patent No.: US 6,638,641 B2
(45) Date of Patent: Oct. 28, 2003

(54) FRICTION WELDING WITH CONOIDS

(75) Inventor: Andrew Douglas Delano, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 101 days.

(21) Appl. No.: 09/974,538

(22) Filed: Oct. 10, 2001

(65) Prior Publication Data

US 2003/0066864 A1 Apr. 10, 2003

(51) Int. Cl.[7] ............ B32B 15/01; B23K 20/12
(52) U.S. Cl. ............ 428/599; 428/594; 228/112.1; 228/114.5
(58) Field of Search .................. 428/599, 594; 228/112.1, 114.5

(56) References Cited

U.S. PATENT DOCUMENTS

| | | | |
|---|---|---|---|
| 5,975,406 A | | 11/1999 | Mahoney et al. |
| 6,106,233 A | * | 8/2000 | Walker et al. .......... 416/213 R |
| 6,454,531 B1 | * | 9/2002 | Crawmer .................. 228/175 |

* cited by examiner

*Primary Examiner*—Deborah Jones
*Assistant Examiner*—Jason Savage

(57) ABSTRACT

A joining process and friction welded structure is disclosed, including a first member with a conoid recess, and a second member with a second conoid tip that is friction welded to the recess in the first member. One, or both, of the conoids may be a non-spheroid, such as a paraboloid. In addition, the conoid recess may have a vertex angle that is greater than a vertex angle of the conoid tip.

10 Claims, 4 Drawing Sheets

EES Ver. 5.226: Educational version distributed by WCB/McGraw-Hill
{Friction Welding Model}
{Weld Parameters: 4540lbf, 3200rpm,.5s, wk^2=1.62 ftlb^2 }
{1} F=20195 {N}
{2} ro=16 {mm}
{3} mu=.5
{4} rpm=3200 {rpm}
{5} omega=rpm*2*pi/60 {radians/second}
{6} Vr=omega*r
{7} Pfr=mu*F*r*omega*sin(theta) {N*m/s....Watts}
{8} Pfr=2.538e4/2.5 {constant weld power dissipation}
{9} {r=.0075} {meters}
{10} h1=tan(theta)
{11} h=inc/tan(theta) {meters}
{12} {lmh=-0.015} {meters}
{13} inc=tablevalue(4,2)-tablevalue(3,2)
{14} {theta=90}
{15} pstep=step-1
{16} ppstep=step-2
{17} htot=-(tablevalue(pstep,7)+-tablevalue(ppstep,9))
{18} radj=tablevalue(pstep,2)

FIG. 4

FRICTION WELDING WITH CONOIDS

TECHNICAL FIELD

The technology described here generally relates to fusion bonding using dynamic frictional energy and, more particularly, friction welding by rotating one work surface relative to another about an axis.

BACKGROUND

Friction welding is a process in which metals, and/or other materials, are joined by heat which is generated when the parts are rubbed together under high pressure. The advantages of friction welding include very rapid completion rates, good mechanical properties, and the elimination of the need for shielding gases under most circumstances. There are at least twenty variants of friction welding processes. Some of those variants include rotary friction welding, friction stud welding, radial friction welding, linear friction welding, orbital friction welding, third-body friction welding, and friction taper plug welding.

Friction stir welding is a relatively new friction welding process. It involves rotating a small tool between two closely-butted components. Frictional heating causes the materials in the components to soften and the forward motion of the tool forces material from the front of the tool to the back, where it consolidates to form a solid state weld. Stir welding processes thus combine the flexibility of mechanized arc welding with the desirable results of friction welding.

Friction stir welding has been used to join various materials that will soften and co-mingle under applied frictional heat, including as metals and plastics. For example, U.S. Pat. No. 5,975,406, filed Feb. 27, 1998 by Mahoney et al. (and assigned at issuance to the Boeing Company) discloses a method to repair voids in aluminum alloys, and is incorporated by reference here in its entirety. As reproduced in FIG. 1 of the present application, an aluminum work piece 30 with an anomaly void is machined in order to provide a tapered bore 34 with grooves and ridges 36 provided on the surface of the bore. A consumable tapered plug 38 is then inserted into the tapered bore 34 with a larger section 40 connected to a rotating motor (not shown).

As shown in FIG. 2, the included angle cc of the tapered bore 34 is preferably greater than the included angle of the tapered plug 38 in order to ease rotation of the tapered plug, and to prevent air from being between the tapered plug, tapered bore, and/or tapered ridges 36. Until now, however, the shapes of the tapered plug 38 and tapered bore 34 have not been adequately considered with regard to friction stir welding and/or other friction welding processes.

SUMMARY

These and other drawbacks of conventional technology are addressed here by providing a joining method and friction welded structure including a first member with a conoid recess, and a second member with a second conoid tip that is friction welded to the recess in the first member. One, or both, of the conoids is preferably a non-spheroid, such as a paraboloid. In addition, the conoid recess preferably has a vertex angle that is greater than the vertex angle of the conoid tip.

BRIEF DESCRIPTION OF THE DRAWINGS

The various embodiments will now be described with respect to the following figures, where the reference numerals have been consistently used to identify the same features in each of the drawings.

FIG. 4 is a software code listing for a friction welding model; and

DETAILED DESCRIPTION OF THE PREFERRED EMBODIMENTS

Conic sections, or "conics," are some of the oldest curves to be mathematically studied. Conics are formed by the intersection of a right circular cone and a plane. The cone may have any vertex angle; however, it is the angle of intersection between the cone and the plane that determines whether the resulting curve is an ellipse, parabola, or hyperbola.

In mathematical terms, conics can be defined as follows: Given a "directrix" line D, and a "focus" point F not on D, a conic is the locus of points P such that the distance from P to F divided by the distance from P to D is a constant referred to as the "eccentricity." If the eccentricity is equal to 1, the resulting conic is a parabola, while eccentricities less than 1 result in an ellipse and eccentricities greater than 1 result in a hyperbola.

A solid formed by the revolution of a conic about its axis is referred to as a "conoid." If the conic is a parabola, the resulting solid is a parabolic conoid or "paraboloid." Similarly, if the conic is a hyperbola, then the solid is referred to as a hyperbolic conoid, or "hyperboloid," while an ellipse forms an elliptic conoid, also known as an "ellipsoid," or a spheroid. The term "conoid" is used here to include truncated conoids, and/or other partial conoids, including conoids having incongruous portions near zones of high curvature. "Non-spheroid conoid" is used here to refer to non-spherical ellipsoids, paraboloids, hyperboloids and/or portions thereof.

Figure 1:
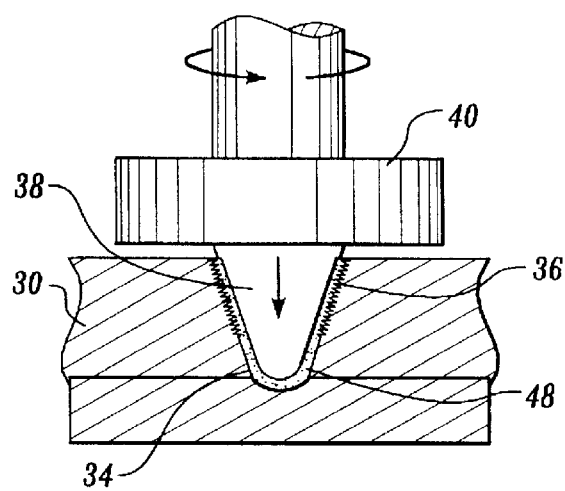
FIG. 1 is a schematic illustration of a conventional friction welding procedure.
Figure 2:
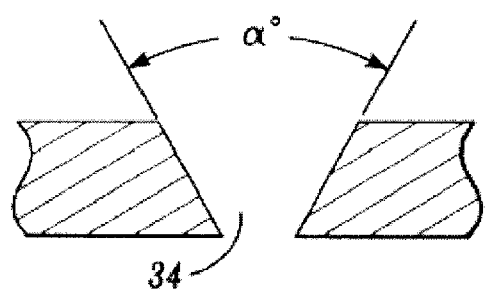
FIG. 2 illustrates the included angle from FIG. 1.
Figure 3:
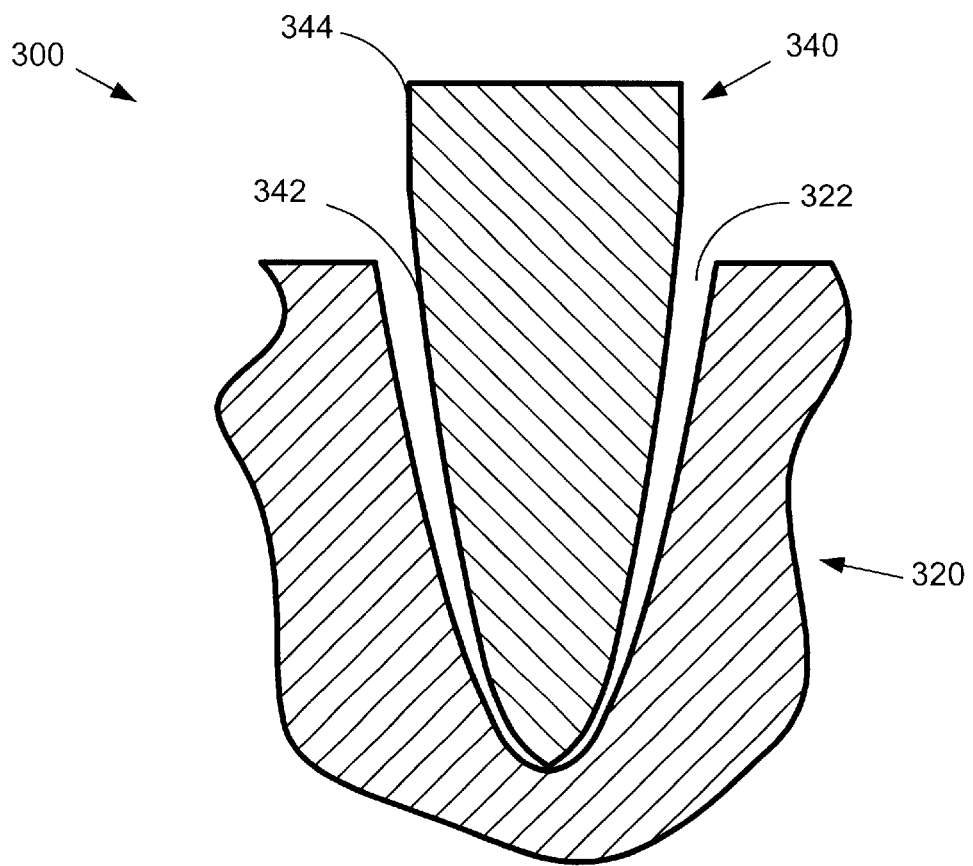
FIG. 3 is a cross-sectional illustration of a friction welding structure.

FIG. 3 is a cross-sectional view of a friction welding structure 300. The structure 300 includes a first member 320 having a conoid recess 322 formed therein. The recess 322 is preferably a non-spheroid conoid and, more particularly, a paraboloid. A second member 340 is arranged in the recess 322. The second member 340 includes a conoid tip 342. The tip 342 is also a non-spheroid conoid and preferably corresponds to the shape of the recess 322. For example, since the recess 322 is a paraboloid, the tip 342 is also illustrated as a paraboloid. Furthermore, the paraboloid recess 322 has a vertex angle that is substantially the same as, or preferably greater than, the vertex angle of the paraboloid tip 342. The second member 340 also includes an optional base 344 for securing the second member 340 to a rotating driver. For example, the base 344 may be a cylindrical shank for mounting in a chuck.

During the friction welding process, the second member 340 is inserted into the recess 322 in the first member 320. Typically, a small gap will be formed between the sides of the first and second members 320, 340. The first and second members 320, 340 are then rotated relative to each other so that frictional heat is created at the point of contact between the end of the tip 342 and the base of the recess 322. The contact initially occurs at the deepest point in the recess 322 and then proceeds outward as the material from the second member 340 forges its way into the material of the first member 320. The vertex angle difference between the conoid recess 322 and the conoid tip 342 ensures that the tip of the first member 340 will displace all, or most, of the air contained in the recess 322 during the welding process.

A paraboloid recess 322 and paraboloid tip 342 are preferred in order to provide an evenly distributed weld energy over the surface of the tip. This even distribution provides improved efficiency and weld properties, especially when joining dissimilar materials such as an aluminum first member with a copper second member. For example, these materials are often used in order to provide a copper heat sink in an aluminum housing for integrated circuits as in Agilent Technologies' "Articooler" family of products. This preferred shape was determined using the computer simulator technology described in more detail below.

Further practical considerations often require the end of the tip 342 to be truncated, preferably in a plane that is substantially perpendicular to the longitudinal (vertical in FIG. 3) axis of the tip. Flattening the end of the tip 342 in this manner allows the tip to be more stably positioned in a flat-bottomed hole prior to spinning. Similarly, a conic, or otherwise pointed, tip may also be used in a flat-bottomed or correspondingly-shaped recess for stabilizing the tip. Furthermore, it can be difficult to accurately form a conoid profile with a small diameter near the end of the tip. Therefore, the highly curved end of the tip 342 may vary from the preferred conoid form as dictated by the need for stability, manufacturability, and/or other considerations without significantly departing from the function and result of the technology disclosed here.

FIG. 4 is a computer code listing 400 for a friction welding model that can be executed with the "Engineering Equation Solver" (EES) software available from F-Chart Software of Middleton, Wis. The model starts with the weld parameters listed at the top of the page; namely, that the tip 342 (FIG. 3) is secured to a flywheel having a moment of inertia equal to 1.62 ft-lb$^2$ and rotating at 3200 rpm. The model assumes that the tip 342 will be forced into the recess 322 (FIG. 3) with a normal force of 4540 lbs so that it will come to rest in about 0.5 seconds.

The EES software solves the unbracketed equations in lines 1–8, 10–11, 13 and 15–18 of the code 400 for the radius "radj" of the tip 342 (in meters) for the distance "htot" (also in meters) from the (bottom in FIG. 3) end of the tip 342, where "F" is the compressive force (in Newtons);
"ro" is the largest outer radius of the tip (in millimeters);
"mu" is the sliding coefficient of friction between the tip and base (dimensionless);
"omega" is the angular velocity of the tip (in radians per second);
"Pfr" is the power dissipated by friction at the edge of the tip (held constant at 10.15 kilowatts);
"r" is the distance from the longitudinal (vertical in FIG. 3) axis of the tip (in meters); and
"theta" is the angle of the curve formed at the edge of the tip (in radians, from vertical in FIG. 3).

The bracketed information including, the equations in lines 3, 12, and 14, does not form part of the calculation. However, these portions of the model may be un-bracketed in order to further constrain the model.

Figure 5:
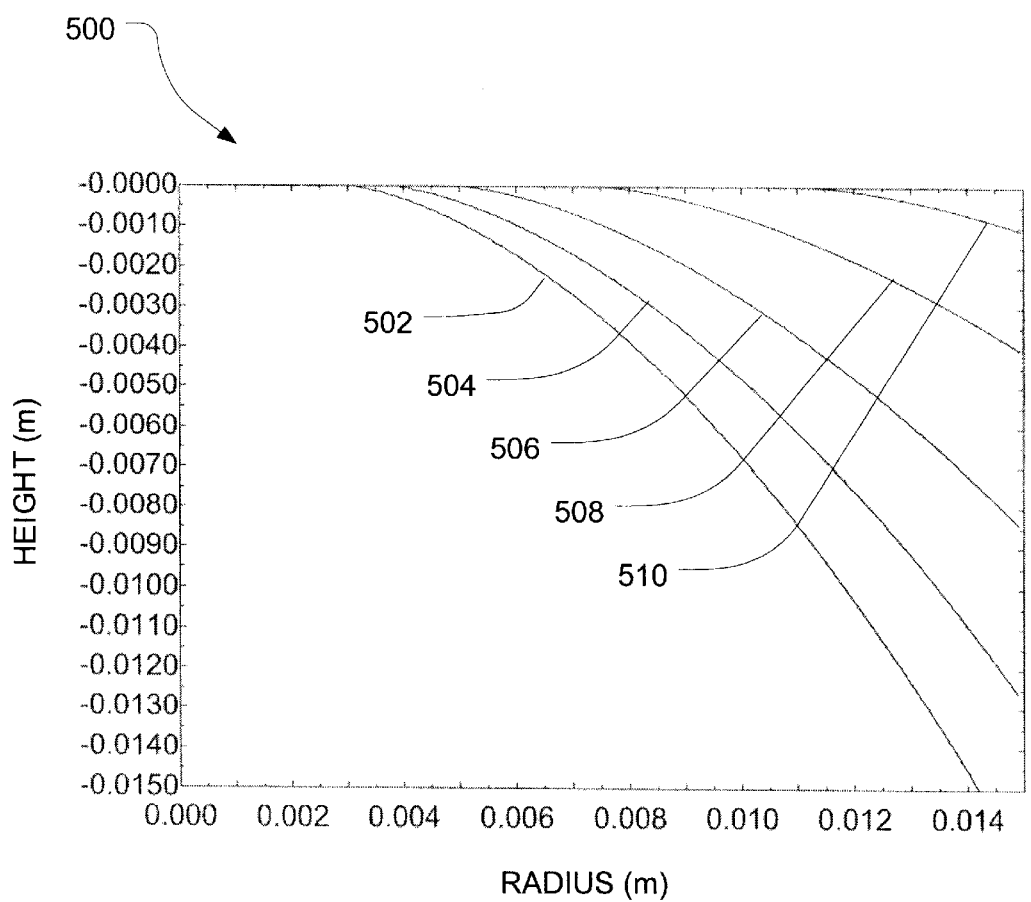
FIG. 5 is a plot of data from the software shown in FIG. 4.

The output of these solutions is shown in the plot 500 in FIG. 5 where the vertical axis is the distance (in meters) from the lower end of the tip 342 (in the orientation shown in FIG. 3) and the horizontal axis shows the radial distance (also in meters) from the longitudinal (vertical in FIG. 3) axis of the tip 342. In other words, the plot 500 shows various half-profiles for the tip 342 if it were rotated 180° from the orientation shown in FIG. 3. Curve 502 illustrates the results for the data shown in FIG. 4 while curves 504–510 illustrate results for other weld parameters; such as lower compressive forces, slower rpm, less friction, and/or higher weld dissipation energies.

In FIG. 5 each of the curves 502–510 moves to a value of zero height at some radius that is greater than zero. It is expected that, with lower values of weld dissipation energy, the curves 502–510 could be more accurately determined to have non-zero values for small radius values. Nonetheless, this aspect of the plot 500 further illustrates the difficulty associated with precisely describing and/or forming the end of the tip 342 so as to provided constant power dissipation near the center of the tip. Similarly, the plot 500 illustrates how the end of the tip 342 may be truncated, or otherwise incongruously formed without significantly affecting the function or result provided by this technology provided by constant weld power dissipation along the remainder of the tip.

When conventional curve-fitting techniques are applied to the curves 502–510 shown in FIG. 5, it was found that parabolic curves provide the closest matches for values of height that are greater than zero. It can therefore be concluded from the results of the simulation that the optimum profile of the tip 342 is a parabola for most weld parameters. Since the profile is presumed to be the same for all positions around the rotating tip, the optimal shape for the tip can be can extrapolated to a three-dimensional paraboloid. Furthermore, due to the geometric relationship between parabolas and other conic sections, it is expected that similarly useful results (though not necessarily optimum power dissipation) will occur for other conoid shapes, and especially non-spheroid conoids.

The technology described above has been found to provide complete air elimination and low resistivity at the weld function. In addition, these techniques provide better mechanical properties and higher production notes compared to conventional butt welding and soldering technologies.

It should be emphasized that the embodiments described above, and particularly any "preferred" embodiments, are merely examples of various implementations that have been set forth here to provide a clear understanding of various aspects of the invention. One of ordinary skill will be able to alter many of these embodiments without substantially departing from scope of protection defined solely by the proper construction of the following claims.

What is claimed is:

1. A friction welded structure comprising:
   a first member having a conoid recess, the conoid recess having a surface defined by points of a first conic section rotated about an axis of the first conic section, the conoid recess having a first vertex angle; and
   a second member having a conoid tip, the conoid tip having a surface defined by points of a second conic section rotated about an axis of the second conic section, the conoid tip having a second vertex angle, the second vertex angle being no greater than the first vertex angle, the conoid tip being friction welded in the conoid recess.

2. The friction welded structure of claim 1, wherein the conoid tip is friction welded in the conoid recess by aligning an axis of the conoid tip with an axis of the conoid recess and rotating the conoid tip relative to the conoid recess.

3. The friction welded structure of claim 1, wherein the conoid recess and the conoid tip are non-spherical conoids.

4. The friction welded structure of claim 3, wherein the non-spherical conoids are paraboloids, the paraboloids defined by points of a parabola rotated about an axis of the parabola.

5. The friction welded structure of claim 1, wherein the second vertex angle is less than the first vertex angle.

6. A method for joining members together, the method comprising:

provide a first member having a conoid recess, the conoid recess having a surface defined by points of a first conic section rotated about an axis of the first conic section, the conoid recess having a first vertex angle;

providing a second member having a conoid tip, the conoid tip having a surface defined by points of a second conic section rotated about an axis of the second conic section, the conoid tip having a second vertex angle, the second vertex angle being no greater than the first vertex angle; and friction-welding the conoid tip in the conoid recess.

7. The method of claim 6, wherein friction-welding the conoid tip in the conoid recess comprises:

aligning an axis of the conoid tip with an axis of the conoid recess; and rotating the conoid tip about its axis relative to the conoid recess.

8. The method of claim 6, wherein the conoid recess and the conoid tip are non-spherical conoids.

9. The method of claim 8, wherein the non-spherical conoids are paraboloids, the paraboloids defined by points of a parabola rotated about an axis of the parabola.

10. The method of claim 9, wherein the second vertex angle is less than the first vertex angle.

* * * * *